No. 729,007.

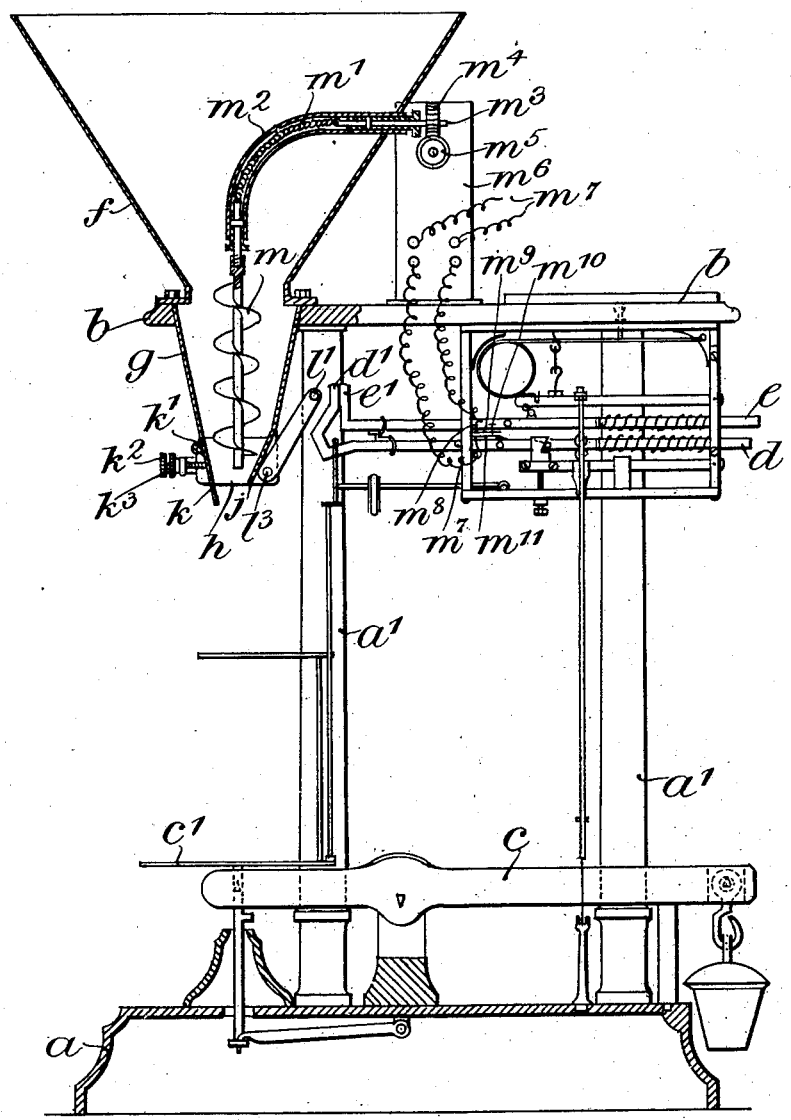

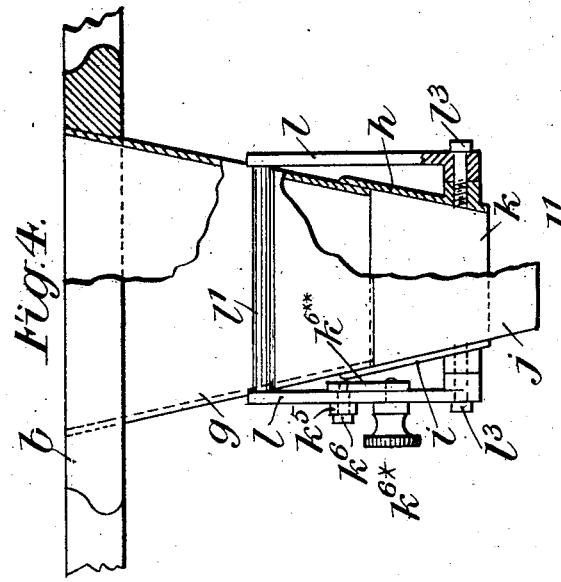
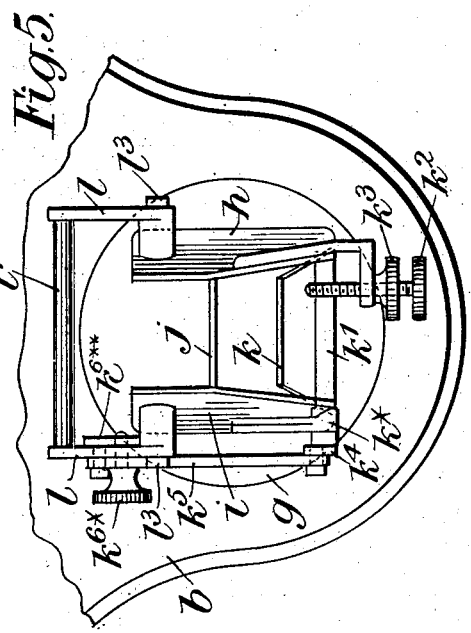
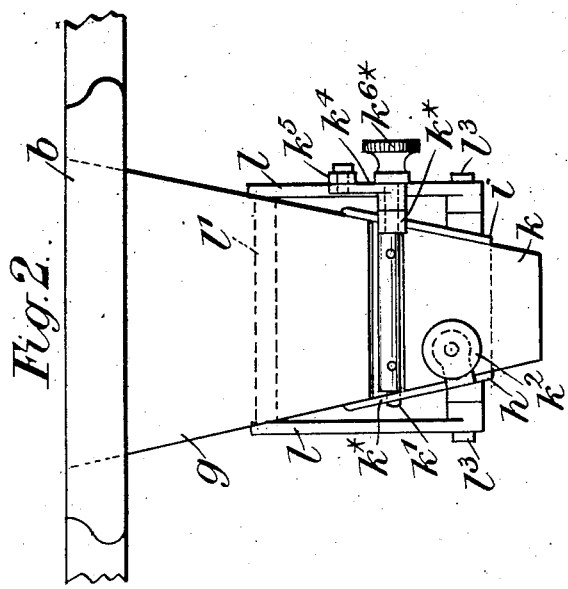
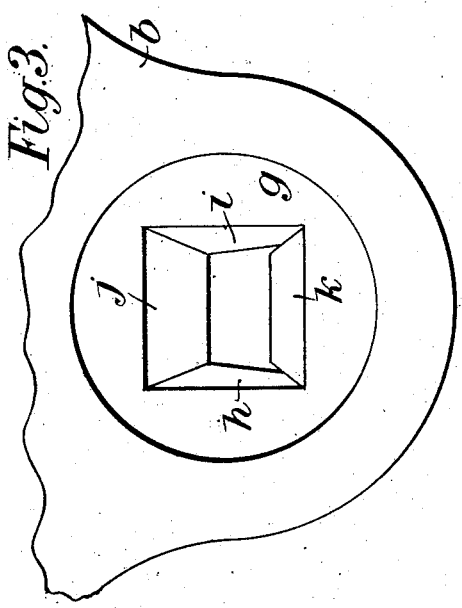

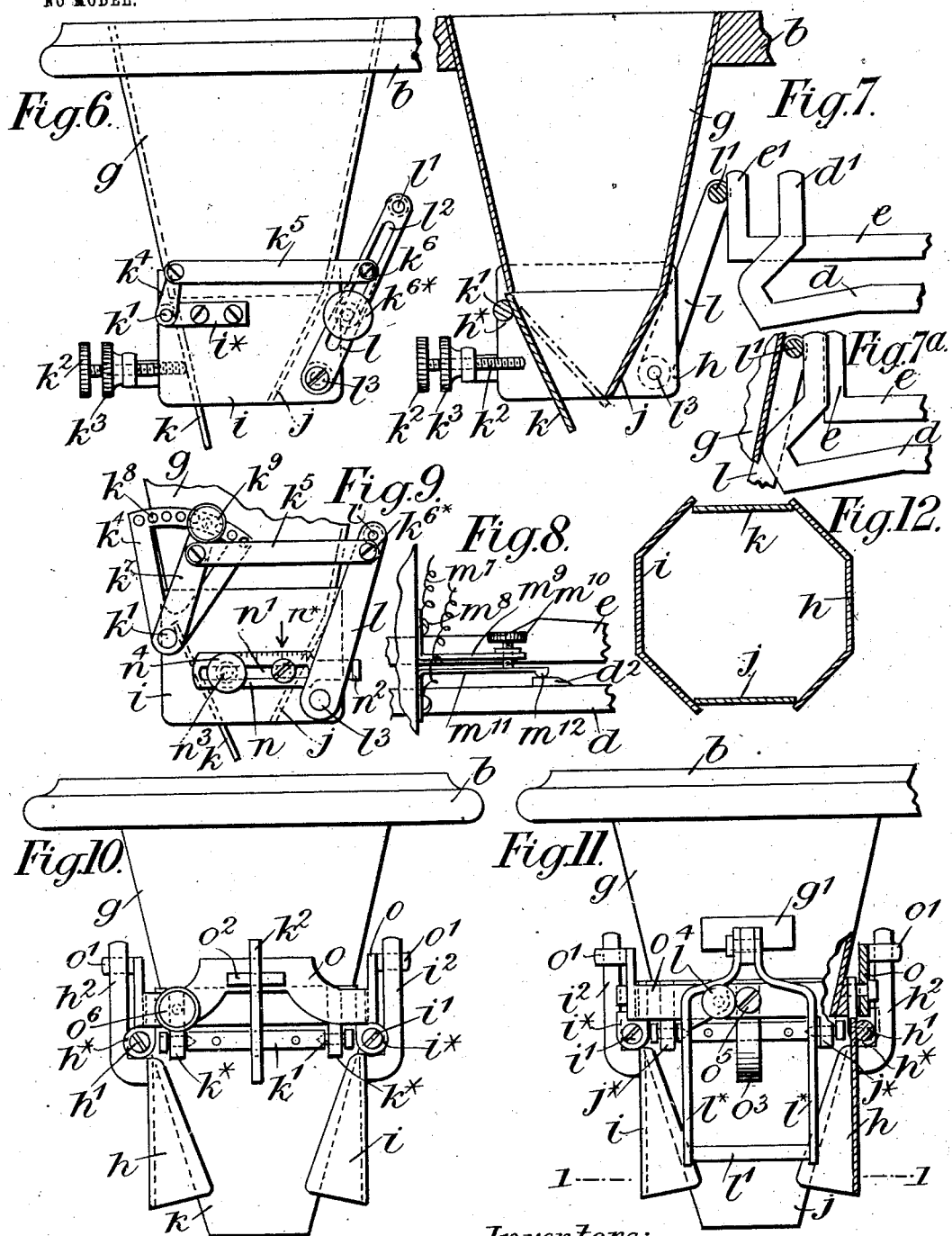

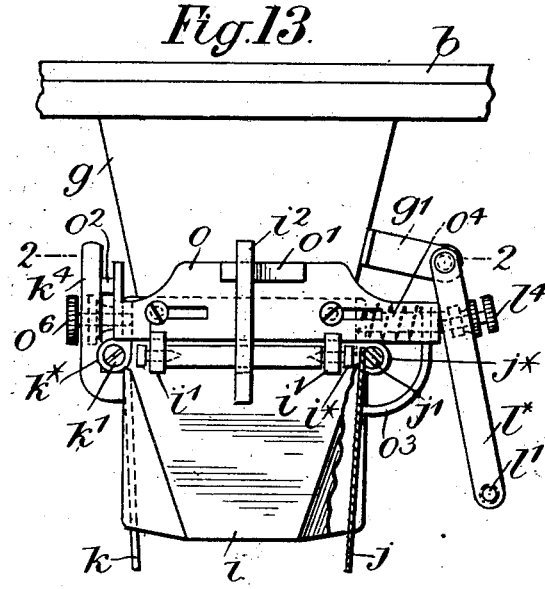
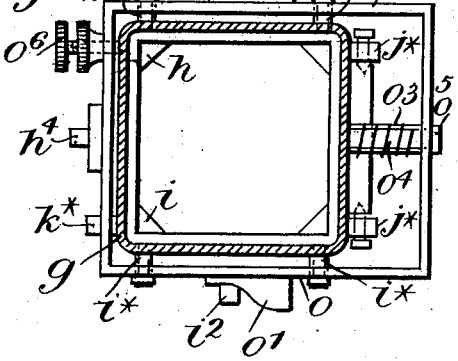
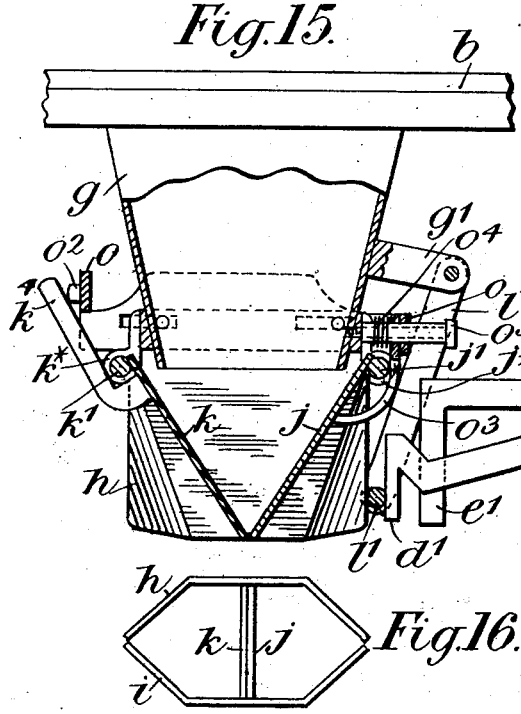
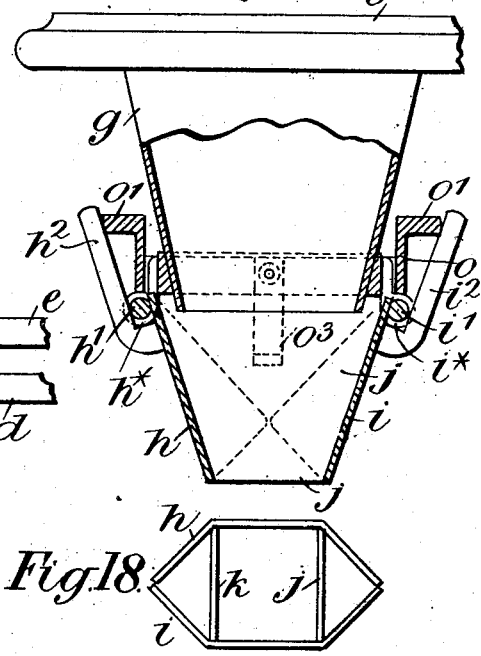

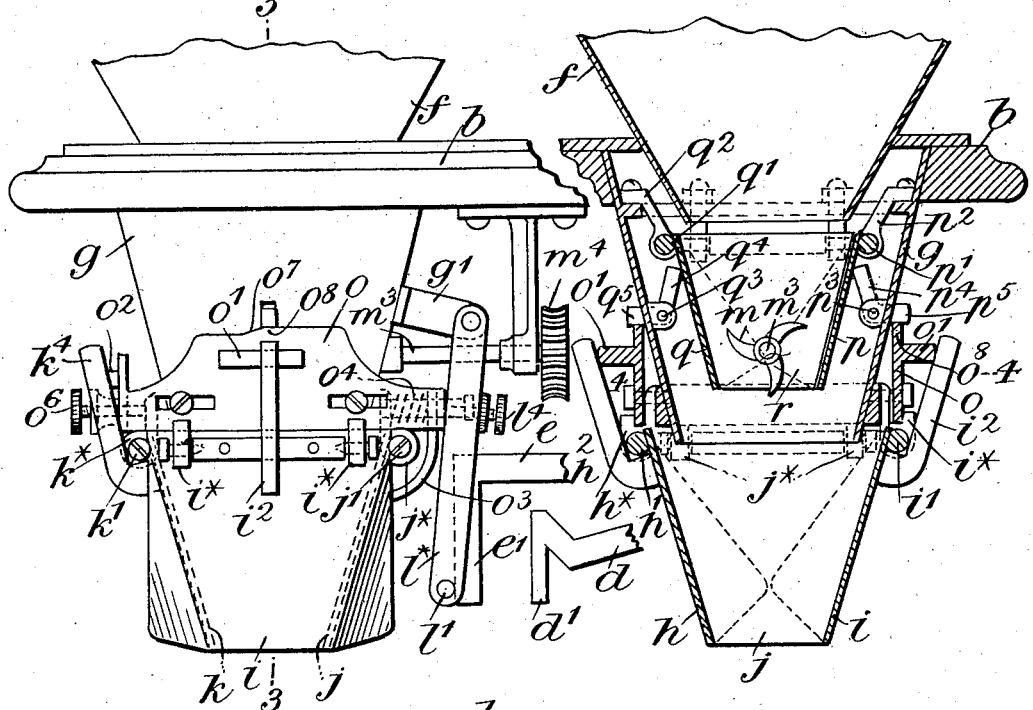

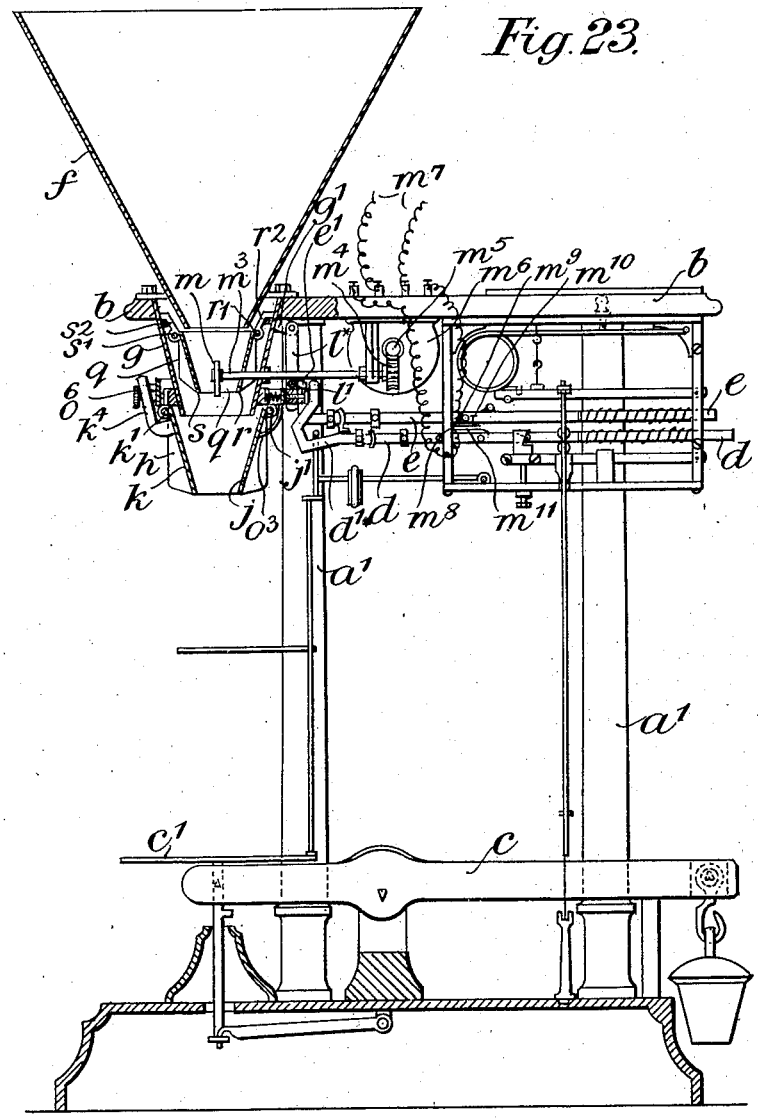

Patented May 26, 1903.

UNITED STATES PATENT OFFICE.

JOHN PEMBERTON STUBBS, OF BALHAM, AND GEORGE MARMADUKE STUBBS, OF BOURNEMOUTH, ENGLAND.

APPARATUS FOR WEIGHING TEA, &c.

SPECIFICATION forming part of Letters Patent No. 729,007, dated May 26, 1903.

Application filed February 15, 1902. Serial No. 94,285. (No model.)

*To all whom it may concern:*

Be it known that we, JOHN PEMBERTON STUBBS, civil engineer, residing at 43 Wroughton road, Balham, in the county of Surrey, and GEORGE MARMADUKE STUBBS, gentleman, residing at Broomwood, Westbourne Park Road, Bournemouth, in the county of Hants, England, subjects of the King of Great Britain, have invented certain new and useful Improvements in or Connected with Machinery or Apparatus for Weighing Tea and other Granular Substances, of which the following is a specification, reference being had to the accompanying drawings and to the letters marked thereon—that is to say:

The invention relates, primarily, to improvements upon an invention in respect of which Letters Patent of the United States of America were granted to John James Marshall, dated the 6th day of August, 1901, No. 680,160.

According to the specification of the above-recited Letters Patent, the material to be weighed is fed into a hopper and is thereby conducted into bags or the like placed upon a scale-pan beneath, the flow of material from the hopper-outlet being first reduced and finally cut off by means of sliding cup-shaped valves actuated by sliding rods, one of which is automatically brought into action as the material on the scale-pan approaches the required weight and the other when the required weight is reached.

It has been found in practice that the different materials required to be weighed vary considerably in specific gravity and granular formation, and consequently the area of the valve-aperture through which they pass is required to be varied or regulated according to the nature of the material under treatment, and this regulation is impracticable in machines of the character hereinbefore referred to; and the primary object of the present invention is to obtain a valve that will fulfil the requirements incidental to the weighing of different kinds of materials.

In the accompanying drawings, Figure 1 is a side elevation, partly in section, of a weighing-machine having the present invention applied thereto. Fig. 2 is a front elevation of the valve-hopper and connected parts separately and showing the valvular mouth fully open. Fig. 3 is a plan thereof. Fig. 4 is a rear elevation thereof, partly in section. Fig. 5 is an under side view thereof. Fig. 6 is a side elevation thereof. Fig. 7 is a vertical section thereof, but showing the valvular mouth partly closed by the action of the diminishing-rod. Fig. 7ª is a similar view to Fig. 7, but showing the valve completely closed by the action of the cut-off rod. Fig. 8 is a detail view of the electric contacts of the electrically-driven feeding apparatus. Fig. 9 is a side elevation of part of the valve-hopper, illustrating a modified device for regulating the opening of the valve. Fig. 9ª is a side view of the cranked ends of the sliding diminishing and cut-off rods, illustrating means for rendering them adjustable. Fig. 10 is a front elevation of the valve-hopper, illustrating a modification in the construction of the valve and showing the same fully open. Fig. 11 is a rear elevation thereof, partly in section. Fig. 12 is a horizontal section taken on the line 1 1 of Fig. 11. Fig. 13 is a side elevation thereof, partly in section. Fig. 14 is a horizontal section taken on the line 2 2 of Fig. 13. Fig. 15 is a side elevation thereof, partly in section, showing the valvular mouth closed. Fig. 16 is an under side view of the mouth. Fig. 17 is a similar view to Fig. 15, but taken at right angles thereto and looking toward the front of the machine. Fig. 18 is an under side view of the mouth thereof, but showing the same partially closed. Fig. 19 is a side elevation of the valve-hopper and connected parts, illustrating a further modification. Fig. 20 is a vertical section taken on the line 3 3 of Fig. 19, the lower or main valve being partially closed and the upper or supplemental valve in its closed or contracted position. Fig. 21 is a horizontal section taken on the line 4 4 of Fig. 20. Fig. 22 is a vertical section taken at right angles to Fig. 20 of the upper or supplemental valve and connected parts, its extreme open position being shown by dotted lines; and Fig. 23 is a side elevation, partly in section, of a complete machine, illustrating the application thereto of the main and supplemental valves and the adjustable-ended sliding diminishing and cut-off rods.

In the several figures, in which like parts are indicated by similar letters of reference, Figs. 1 and 23 are drawn to a reduced scale with respect to the other figures of the drawings.

Referring to Figs. 1 to 8, $a$ represents the base of the machine, $a'$ represents standards fixed therewith, $b$ represents a table supported by the standards, $c$ represents the scale-beam, and $c'$ represents the scale-pan.

$d$ and $e$ represent the spring-actuated sliding rods, which are released by the descent of the scale-beam $c$ and shoot forward to actuate the diminishing and cut-off mechanism, as described in Marshall's said specification No. 680,160, and inasmuch as our present invention only relates to said mechanism and as the general features of the machine are fully described in Marshall's said specification we do not think it necessary to again describe the machine in detail, but will confine ourselves to a reference to such parts as are necessary to enable our invention to be clearly understood.

$f$ represents the usual hopper, into which the material to be weighed is introduced, and $g$ represents a smaller or valve hopper, which receives the material from the hopper $f$ and is furnished with diminishing and cut-off valves, as hereinafter described, by the aid of which the flow of the material being weighed into a bag or other receptacle placed upon the scale-pan $c'$ is first reduced as the weight of the material nearly approaches a given standard and is finally cut off when said standard is reached.

In carrying the present invention into effect at opposite sides of and extending beneath the mouth or outlet of the valve-hopper $g$ are fixed two side plates $h$ and $i$, which are inclined toward each other, and between said side plates and shaped to the angle thereof and fixed therewith is a plate $j$, which extends in an inclined position from the mouth of the hopper $g$ until its lower edge occupies a position at about the center of the hopper. Also between the side plates $h\ i$, but at a diametrically opposite point with relation to the hopper-mouth, is arranged a similar but movable plate shutter or valve $k$, the upper edge of which is fixed with a shaft $k'$, mounted with capability of turning in bearings $k^*$, carried by the side plates $h\ i$, and these several plates constitute a valve-chamber and valve.

The plate shutter or valve $k$ is adapted to swing upon its axis in one direction until its lower edge meets and closes against the fixed inclined plate $j$, as shown by the dotted lines in Fig. 7, to cut off the flow of material and in the other direction until it assumes a more or less vertical position, as shown at Fig. 6, to allow a free flow to the material; but it is capable of regulation in order to vary the area of the maximum opening by a stop or set-screw $k^2$, provided with a jam-nut $k^3$, as shown more particularly at Figs. 6 and 7.

Fixed upon one end of the shaft $k'$ of the plate shutter or valve $k$ is a vertical crank arm or lever $k^4$, to the upper end of which is pivotally connected one end of a horizontal link $k^5$, the opposite end of which is connected with a pivot $k^6$, capable of sliding in a longitudinal slot $l^2$, formed in one of a pair of vertical levers $l$, and said pivot is by a link $k^{6**}$ connected with a binding-screw $k^{6*}$, adjustable in the slot $l^2$, while at their lower ends the levers $l$ are pivotally mounted upon studs $l^3$, carried by the lower parts of the side plates $h\ i$ and at their upper ends connected by a cross-bar $l'$ and hereinafter for the sake of distinction called the "cross-bar" levers.

The spring-actuated sliding rods $d\ e$ are formed with cranked ends $d'\ e'$, adapted in the forward movement of said rods to engage the connecting-bar $l'$ of the cross-bar levers, and said cranked rods are, as described in Marshall's said specification, so arranged that the end $e'$ of the reducing-rod $e$, which is the first to act, strikes said cross-bar $l'$ and partially closes the swinging plate shutter or valve $k$, as shown at Fig. 7, thereby reducing the flow of material and the other rod $d$, which comes into action at the required time by its end $d'$ acting against the cross-bar $l'$, completely closes said valve $k$, as shown by the dotted lines in Fig. 7 and by the full lines in Fig. 7ª, thereby entirely cutting off said flow.

By the adjustments hereinbefore described the area of the full aperture of the valve-chamber and of the reduced aperture for diminishing the flow of material to be weighed may be regulated as to the one by adjusting the set-screw $k^3$, controlling the angle to which the swinging valve or shutter $k$ opens and as to the other by adjusting the position of the pivotal connection $k^6$ of the link $k^5$ in the slot $l^2$ of the cross-bar levers $l$.

In cases where the material to be weighed does not flow as freely as is desirable for accurate weighing a stirring, agitating, or feeding device is employed to assist the flow. Such a device is shown at Figs. 1 and 8, and it consists of a screw $m$, to which is fixed one end of a flexible shaft $m'$, working in a tubular guide $m^2$, and the other end of which shaft $m'$ is fixed to a short shaft $m^3$, upon the other end of which is fixed a worm-wheel $m^4$, which engages a worm $m^5$, fixed on the shaft of an electromotor $m^6$, which is by conductors $m^7$ connected with the poles of any suitable source of electricity, and by these means the conveyer or stirrer $m$ receives the required motion.

In order that the feed-screw $m$ may be set in action at the required time—that is to say, when the valve $k$ is fully open and may be put out of action immediately that the valve $k$ is closed by the sliding rod $d$, as hereinbefore described—the continuity of the conductor $m'$ is broken and one end thereof is connected with a terminal $m^8$, carrying an insulated spring-arm $m^9$, provided with a contact-making screw $m^{10}$, while the other end thereof is connected with an insulated spring contact-piece $m^{11}$, provided with a rounded nose $m^{12}$, adapted to ride up an incline $d^2$ upon the sliding rod $d$ in the retraction of the latter to its normal position, and thus hold the contact-piece $m^{11}$ in contact with the contact-screw $m^{10}$, thereby completing the circuit and causing the conveyer or stirrer $m$ to work until the cut-off rod $d$ shoots forward and closes the valve, when the contact-piece $m^{11}$ will fall away from the contact-screw $m^{10}$ and break the circuit.

It will be obvious that any other suitable stirrer or agitator may be substituted for the screw $m$, according to the nature of the material being weighed, and that other means than the electromotor may be employed to drive the same.

It will be understood that when weighing some kinds of materials the stirrer or agitator may be dispensed with.

In the example given at Fig. 9 is shown a modification of the regulating means for controlling the full aperture or extent to which the valve $k$ can open and also the area of the reduced aperture of the partial cut-off. This device consists of a sliding plate $n$, mounted upon the outside of the side plate $i$ and provided with a longitudinal slot $n'$, through which passes a screw-stud $n^3$, fixed with said side plate and furnished with a binding-nut $n^4$ for fixing the plate $n$ in the desired position. The plate $n$ is prolonged beyond one of the cross-bar levers $l$, where it is formed with a returned or cranked end $n^2$, adapted to engage and limit the outward movement of said lever, and bordering the slot $n'$ the plate $n$ is provided with a divided scale, and the side plate $i$ is furnished with a coacting index or pointer $n^*$, by the aid of which the plate $n$ may be accurately adjusted. In connection with this arrangement the lever $k^7$ of the shaft $k'$ of the swinging shutter $k$ is loosely mounted on said shaft, and the link $k^5$, coupling the same with one of the cross-bar levers $l$ instead of being connected with the latter by a pivot $k^6$, adjustable in a slot $l^2$ therein, is connected therewith by a fixed pivot $k^{6*}$, the slot $l^2$ being dispensed with, while a sector $k^4$ is fixed with the shaft $k'$ of the swinging shutter or valve $k$ and is perforated with a row of tapped holes $k^8$, one or other of which is adapted to receive a thumb or set screw $k^9$, carried by the free end of the lever $k^7$, which is loosely mounted on the shaft $k'$. By this arrangement the full aperture of the valve-chamber—that is to say, the angle to which the valve $k$ opens and also the reduced area of the aperture of the partial cut-off—may be regulated with precision.

In the example given at Figs. $9^a$ and 23 the cranked ends $d'$ $e'$ of the sliding rods $d$ $e$ are formed separate from their rods and provided with eyes $d^3$ $e^3$, closely fitting said rods and furnished with set-screws $d^4$ $e^4$ for fixing them in position thereon, by which arrangement an additional means of regulation is provided.

In the example given at Figs. 10 to 18 a modified arrangement of valves is shown adapted to be employed when weighing some kinds of materials—such, for example, as tea and flour—which do not flow with the same facility as some other materials, in which case a full aperture of larger area than that hereinbefore shown and described is desirable in the valve-chamber. For this purpose the four sides $h$ $i$ $j$ $k$ of the valve-chamber are mounted upon axes $h'$ $i'$ $j'$ $k'$, carried by lugs or bearings $h^*$ $i^*$ $j^*$ $k^*$, with capability of swinging or oscillating, and two of them, $h$ $i$, at opposite sides and which constitute the side shutters or valves are each laterally extended and shaped so as at the lower part to form three sides of an octagonal figure, while the other two, $j$ $k$, which constitute the back and front shutters or valves, respectively, are simple flat tapered plates and are arranged between the shutters $h$ $i$ at opposite sides or edges thereof and form the remaining sides of the octagonal figure, as shown more particularly at Fig. 12. Mounted upon the lugs $h^*$ $i^*$, which constitute guides therefor, is a sliding frame $o$, and the side shutters $h$ $i$, adjacent to their axes, have fixed thereto cranked offsets $h^2$ $i^2$, constituting upwardly-extending vertical levers, which are acted upon by cams or inclines $o'$ upon the sides of the sliding frame $o$ to close said shutters, while the closing of the front shutter $k$ is effected by a similar lever or offset $k^4$, which is acted upon by a projection $o^2$ from the front end of the sliding frame $o$, and the closing of the back shutter $j$ is effected by means of a downward projection or finger $o^3$ from the back of the sliding frame $o$. The cross-bar levers $l^*$, the connecting-bar $l'$ of which is acted upon by the cranked ends $d'$ $e'$ of the sliding diminishing and cut-off rods $d$ $e$ in the manner hereinbefore described with respect to the previous figures, are in the present example for convenience pivotally suspended from an offset $g'$ from the hopper $g$, and the four shutters or valves $h$ $i$ $j$ $k$ are by the rods $d$ $e$ caused first to swing inward, so as to narrow the aperture between them, as shown at Fig. 18, and diminish the flow of material and finally to entirely close, as shown at Figs. 15, 16, and 17, and cut off the supply, the front and back shutters $k$ and $j$ at that time meeting at their lower edges and the side shutters $h$ $i$ closing the openings at their sides. Upon the retraction of the sliding rods $d$ $e$ in order to set them for a fresh weighing operation the return motion of the sliding frame $o$ is effected by means of a spring $o^4$, mounted upon a stud $o^5$, passing through a hole in the back of the frame $o$, or it might be returned by other well known means, and thereupon the other elements of the device naturally return to their normal positions.

The area of the full aperture—that is to say, the extent to which the shutters or valves $h$ $i$ $j$ $k$ can open—is rendered capable of regulation by means of a set-screw $o^6$, carried by the sliding frame $o$, which impinges upon the hopper $g$, or it might be some other fixed part, and thus limits the backward movement of the sliding frame $o$, and consequently the extent to which the shutters or valves open.

The area of the reduced aperture of the partial cut-off is capable of regulation by means of a set-screw $l^4$, carried by the cross-bar levers $l$, which impinges upon the rear end of the sliding frame $o$ and serves to vary the angle of the levers $l^*$ in their normal position, and consequently the degree of motion imparted thereto by the sliding diminishing-rod $e$, and therefore to the frame $o$ and shutters $h\ i\ j\ k$.

Although a stirrer or agitator is not shown in connection with the example lastly hereinbefore given, it will be understood that such a device may be employed, if desired.

In the example given at Figs. 19 to 23 is illustrated a modified arrangement of valves more especially intended for weighing tea. In this case the valves $h\ i\ j\ k$ and the means for actuating them are identical with those lastly hereinbefore described; but in addition thereto an arrangement of supplemental valves or shutters $p\ q\ r\ s$ is provided within the hopper $g$, and the side shutters $p\ q$ are similar in shape to those $h\ i$, and the back and front shutters $r\ s$ are similar in shape to those $j\ k$ of said previous arrangement. The shutters $p\ q\ r\ s$ are suspended with capability of swinging or oscillating upon axes $p'\ q'\ r'\ s'$, carried by brackets $p^2\ q^2\ r^2\ s^2$, and the side shutters $p\ q$ are closed at the required time by means of bell-crank levers mounted upon axes $p^3\ q^3$, and one set of arms, $p^4\ q^4$, of which bear against said shutters and the other arms, $p^5\ q^5$, of which are acted upon by cams or inclines $o^7$ upon the sliding frame $o$, the dwell-like continuations $o^8$ of the inclines $o^7$ thus retaining said shutters during the continued traverse for the frame $o$, while the the back and front shutters $r\ s$ are partially closed at the same time, but they are never entirely closed, by the angular sides of the side shutters $p\ q$, which act cam-like thereon, and the parts then assume the positions indicated at Fig. 21, thereby reducing the area of the aperture. The parts are so timed or arranged that the forward movement of the diminishing-rod $e$ brings the cams or inclines $o^7$ into action, and thus reduces the area of the aperture of the upper valve-chamber at the same time that the area of the aperture of the lower valve-chamber is reduced by the means described with respect to the previous arrangement, and the accurate weighing of the tea is thus insured.

In order to prevent the tea becoming packed in the upper valve-chamber, a stirrer or agitator is there provided and consists of a star-wheel $m$, fixed upon a shaft $m^3$, driven by the means hereinbefore described with respect to Figs. 1 to 8 and similarly put into and out of action.

It will be obvious that the mechanical devices for operating the shutters or valves may be modified without departing from the spirit of the invention.

The valvular apparatus hereinbefore described may be employed in connection with other kinds of weighing-machines than that hereinbefore referred to and may be brought into action and operated by other means than those described.

By the means hereinbefore described various materials which it has hitherto been difficult or impossible to weigh in some automatic machines may be effectually dealt with and the accuracy of the weighing operation will be improved.

Having now particularly described and ascertained the nature of the said invention and in what manner the same is to be performed, we declare that what we claim is—

1. In an automatic weighing-machine, a hopper having a valvular mouth, a pivotally-mounted cross-bar lever, connections from the valvular mouth, to the cross-bar lever, means for regulating the extent to which the mouth can open and means set in motion by the weighing apparatus for differentially acting upon the cross-bar lever at different periods of the weighing operation in order to first partially close and finally completely close the valvular mouth substantially as herein shown and described.

2. In an automatic weighing-machine, a hopper, four valves or shutters pivotally suspended beneath the mouth of the hopper at equidistant points around the same, two opposite ones of said shutters being formed plane but laterally tapered or inclined and the other two opposite valves being formed coextensively of similar shape and beyond that point with lateral extensions inwardly bent at an angle so that in the open or vertical position of the valves or shutters the lower ends thereof and of the lateral extensions together form an octagonal figure while in the closed position of the valves the plane shutters meet at their lower edges and in all positions of the valves the laterally-extended shutters close the side spaces between the plane shutters and means for acting upon the several valves or shutters to partially or entirely close them at the required times substantially as herein shown and described.

3. In an automatic weighing-machine, a hopper, four valves or shutters pivotally suspended beneath the mouth of the hopper at equidistant points around the same, two opposite ones of said shutters being formed plane but laterally tapered or inclined and the other two opposite shutters being formed coextensively of similar shape and beyond that point with lateral extensions inwardly bent at an angle so that in the open or vertical position of the valves or shutters the lower ends thereof and of the lateral extensions together form an octagonal figure while in the closed position of the valves the plane shutters meet at their lower edges and in all positions of the valves the laterally-extended shutters close the side spaces between the plane shutters, means for acting upon the several valves or shutters to partially or entirely close them at the required times and means set in motion by the weighing apparatus for differentially actuating said closing means at different periods of the weighing operation in order to first partially close and finally completely close the valves substantially as herein shown and described.

4. In an automatic weighing-machine, a hopper, four valves or shutters pivotally suspended beneath the mouth of the hopper at equidistant points around the same, two opposite ones of said shutters being formed plane but laterally tapered or inclined and the other two opposite shutters being formed coextensively of similar shape and beyond that point with lateral extensions inwardly bent at an angle so that in the open or vertical position of the valves or shutters the lower ends thereof and of the lateral extensions together form an octagonal figure while in the closed position of the valves the plane shutters meet at their lower edges and in all positions of the valves the laterally-extended shutters close the side spaces between the plane shutters, a horizontally-sliding frame, a pivotally-mounted lever provided with a cross-bar and adapted to engage the frame to move it in one direction, a spring for moving it in the opposite direction, cranks or offsets upon the extended shutters, coacting inclines upon the sides of the frame, a corresponding crank or offset upon one of the plane shutters acted upon by one end of the frame, a projection from the opposite end of the frame acting upon the opposite plane shutter said devices being designed to close the valves and means set in motion by the weighing apparatus for differentially acting upon the cross-bar lever at different periods of the weighing operation in order to first partially close and finally completely close the valves substantially as herein shown and described.

5. In an automatic weighing-machine, a hopper, four valves or shutters pivotally suspended beneath the mouth of the hopper at equidistant points around the same, two opposite ones of said shutters being formed plane but laterally tapered or inclined and the other two opposite shutters being formed coextensively of similar shape and beyond that point with lateral extensions inwardly bent at an angle so that in the open position of the valves or shutters the lower ends thereof and of the lateral extensions together form an octagonal figure while in the closed position of the valves the plane shutters meet at their lower edges and in all positions of the valves the laterally-extended shutters close the side spaces between the plane shutters, a horizontal sliding frame acting upon the shutters to close them, a pivotally-mounted lever adapted to engage the frame to move it in one direction, means for moving it in the opposite direction, adjustable means for regulating the return traverse of the frame, adjustable means carried by the lever for acting upon the frame and means set in motion by the weighing apparatus for differentially acting upon the lever at different periods of the weighing operation in order to first partially close and finally completely close the valves substantially as herein shown and described.

6. In an automatic weighing-machine, a hopper, a plurality of valves or shutters pivotally suspended beneath the mouth of the hopper at equidistant points around the same and adapted to swing and close together, means for closing said valves and means set in motion by the weighing apparatus for differentially acting upon said closing means at different periods of the weighing operation in order to first partially close and finally completely close the valves substantially as herein shown and described.

7. In an automatic weighing-machine, a hopper, a plurality of valves or shutters pivotally suspended beneath the mouth of the hopper at equidistant points around the same and adapted to swing together and close, a sliding frame provided with means for acting upon said valves to close the same, a pivotally-mounted lever for acting upon the frame in one direction and provided with a cross-bar, means for moving the frame in the opposite direction, two sliding rods having a differential traverse and provided with cranked ends adapted to act upon the cross-bar of the lever and means for causing said rods to advance at different periods of the weighing operation in order to first partially close and finally completely close the valves substantially as herein shown and described.

8. In an automatic weighing-machine, a hopper, a plurality of valves or shutters pivotally suspended beneath the mouth of the hopper at equidistant points around the same and adapted to swing together and close, a sliding frame provided with means for acting upon said valves to close the same, a pivotally-mounted lever for acting upon the frame in one direction and provided with a cross-bar, two sliding rods having a differential traverse and provided with cranked ends adjustable upon the rods and adapted to act upon the cross-bar lever and means for causing said rods to advance at different periods of the weighing operation in order to first partially close and finally completely close the valves substantially as herein shown and described.

9. In an automatic weighing-machine, an upper hopper, a hopper, four valves or shutters pivotally suspended beneath the mouth of the hopper at equidistant points around the same, two opposite ones of said shutters being formed plane but laterally tapered or inclined and the other two opposite shutters being formed coextensively of similar shape and beyond that point with lateral extensions inwardly bent at an angle so that in the open or vertical position of the valves or shutters the lower ends thereof and of the lateral extensions together form an octagonal figure while in the closed position of the valves the plane shutters meet at their lower edges and in all positions of the valves the laterally-extended shutters close the side spaces between the plane shutters, a horizontally-sliding frame, a pivotally-mounted lever provided with a cross-bar and adapted to engage the frame to move it in one direction, means for moving it in the opposite direction, cranks or offsets upon the extended shutters, coacting inclines upon the sides of the frame, a corresponding crank or offset upon one of the plane shutters acted upon by one end of the frame, a projection from the opposite end of the frame acting upon the opposite plane shutter said devices being designed to close the valves, a similar upper set of valves or shutters suspended within the hopper, bell-cranks impinging upon the extended ones of the upper valves or shutters, cams or inclines upon the frame terminating in dwells adapted to act upon the bell-cranks and means set in motion by the weighing apparatus for differentially acting upon the cross-bar lever at different periods of the weighing operation in order to first partially close the upper and lower sets of valves or shutters and then finally close the lower set of valves substantially as herein shown and described.

10. In an automatic weighing-machine an upper hopper, a hopper, a plurality of valves or shutters pivotally suspended beneath the mouth of the hopper at equidistant points around the same and adapted to swing together and close, a similar set of valves or shutters suspended within the hopper and means set in action by the weighing apparatus at different periods of the weighing operation and acting to first partially close the lower and upper sets of valves and finally completely close the lower set of valves substantially as herein shown and described.

11. In an automatic weighing-machine, a hopper having a valvular mouth for reducing and cutting off the flow of material from the hopper, sliding rods of differential traverse set in motion by the weighing apparatus at different periods of the weighing operation and acting to first partially close and finally completely close the valvular mouth, a stirrer or agitator within the hopper, means for giving motion to the stirrer, and means acted upon by the cut-off rod in its forward position for arresting the motion of the stirrer substantially as herein shown and described.

12. In an automatic weighing-machine, a hopper, having a valvular mouth for reducing and cutting off the flow of material from the hopper, sliding rods of differential traverse set in motion by the weighing apparatus at different periods of the weighing operation and acting to first partially close and finally completely close the valvular mouth, a stirrer or agitator within the hopper, an electromotor giving motion to said stirrer, a source of electricity, contact devices placed in the electric circuit one being stationary and the other carried by the cut-off rod and so arranged that in the forward position of said rod the circuit is broken substantially as herein shown and described.

JOHN PEMBERTON STUBBS.
GEORGE MARMADUKE STUBBS.

Witnesses to the signature of John Pemberton Stubbs:
C. MELBOURNE WHITE,
C. H. WHITE.

Witnesses to the signature of George Marmaduke Stubbs:
PERCIVAL J. HILLS,
CHARLES STANCLIFFE.